United States Patent
Capozza

(10) Patent No.: US 10,489,995 B2
(45) Date of Patent: Nov. 26, 2019

(54) COLLISION DIAGNOSIS FOR A TRAFFIC EVENT

(71) Applicant: OCTO Telematics S.p.A., Rome (IT)

(72) Inventor: Massimo Capozza, Rome (IT)

(73) Assignee: OCTO Telematics S.p.A., Rome (IT)

( * ) Notice: Subject to any disclaimer, the term of this patent is extended or adjusted under 35 U.S.C. 154(b) by 0 days.

(21) Appl. No.: 15/738,559

(22) PCT Filed: Jun. 21, 2016

(86) PCT No.: PCT/EP2016/064315
§ 371 (c)(1),
(2) Date: Dec. 20, 2017

(87) PCT Pub. No.: WO2016/207162
PCT Pub. Date: Dec. 29, 2016

(65) Prior Publication Data
US 2018/0190044 A1    Jul. 5, 2018

(30) Foreign Application Priority Data
Jun. 22, 2015 (GB) .................................. 1510973.9

(51) Int. Cl.
*G07C 5/08* (2006.01)
*B60R 21/0134* (2006.01)
(Continued)

(52) U.S. Cl.
CPC .......... *G07C 5/0808* (2013.01); *B60R 19/483* (2013.01); *B60R 21/0134* (2013.01);
(Continued)

(58) Field of Classification Search
CPC ............. B60R 21/01532; B60L 3/0007; B60L 3/0015; G01R 27/2605
See application file for complete search history.

(56) References Cited

U.S. PATENT DOCUMENTS 6,266,617 B1 * 7/2001 Evans .................... G08G 1/205
340/436
9,809,196 B1 * 11/2017 Penilla ................... H04N 7/181
(Continued)

FOREIGN PATENT DOCUMENTS

| GB | 2409842 A | 7/2005 |
|---|---|---|
| WO | 2002084875 A2 | 10/2002 |
| WO | 2005012037 A2 | 2/2005 |

OTHER PUBLICATIONS

GB Search Report dated Dec. 1, 2015 for GB Application No. GB1510973.9.
(Continued)

*Primary Examiner* — Hongmin Fan
(74) *Attorney, Agent, or Firm* — EIP US LLP

(57) ABSTRACT

A collision diagnosis (12) is generated for a traffic event involving a vehicle, by receiving an output from a self-capacitance sensor (6) having a single electrode comprising at least part of the bodywork of the vehicle (3) and comparing the received output with at least one threshold (8) to generate provisional collision detection data (9). The provisional collision detection data (9) is correlated with further data (11) relating to the traffic event to produce correlation data and the collision diagnosis (12) is generated on the basis of the correlation data.

17 Claims, 7 Drawing Sheets

(51) Int. Cl.
    *B60R 21/017*    (2006.01)
    *B60R 19/48*     (2006.01)
    *G07C 5/00*      (2006.01)
    *B60R 21/01*     (2006.01)

(52) U.S. Cl.
    CPC .......... *B60R 21/0173* (2013.01); *G07C 5/008* (2013.01); *G07C 5/0816* (2013.01); *B60R 2021/01006* (2013.01); *B60Y 2400/308* (2013.01)

(56)     References Cited

U.S. PATENT DOCUMENTS

| | | | |
|---|---|---|---|
| 2002/0105423 A1* | 8/2002 | Rast .................. | B60Q 1/44 340/479 |
| 2007/0027584 A1* | 2/2007 | Hau .................. | B60R 21/0136 701/1 |
| 2007/0102220 A1* | 5/2007 | Kiribayashi ........ | B60R 21/0136 180/274 |
| 2008/0136613 A1* | 6/2008 | Takafuji .............. | B60R 21/0132 340/436 |
| 2014/0002116 A1 | 1/2014 | Wuerstlein et al. | |
| 2014/0012492 A1* | 1/2014 | Bowers .................. | G08G 1/166 701/301 |
| 2014/0077826 A1 | 3/2014 | Hironaka | |

OTHER PUBLICATIONS

International Search Report and Written Opinion dated Oct. 13, 2016 for PCT Application No. PCT/EP2016/064315.

\* cited by examiner

COLLISION DIAGNOSIS FOR A TRAFFIC EVENT

CROSS-REFERENCE TO RELATED APPLICATIONS

This application is a U.S. national stage entry under 35 U.S.C. § 371 of PCT International Patent Application No. PCT/EP2016/064315, filed Jun. 21, 2016, which claims priority to GB Application No. 1510973.9, filed Jun. 22, 2015. Each of the above-referenced patent applications is incorporated by reference in its entirety.

TECHNICAL FIELD

The present invention relates generally to methods and apparatus for collision diagnosis for a traffic event, and more specifically, but not exclusively, to detection of the occurrence of a collision between a vehicle and another vehicle or object after the collision has occurred.

BACKGROUND

It is known to equip a road vehicle with a collision detection system designed to detect a potential collision with another vehicle or other object, and to avoid the collision by taking corrective action, for example by applying the brakes. Such a system may use one or more sensors to detect the proximity and relative motion of an object with which the vehicle may collide. Typical sensors that may be used for this purpose include radar, capacitive sensors, laser sensing, and acoustic sensing, which may be used with sensors for determining the kinematics of the vehicle, such as accelerometers. Such sensors detect an object within a pre-defined field of view, typically with a forward-facing field of view. Capacitive sensors known for this purpose have two or more electrodes mounted on the vehicle, and detect the proximity of objects in front of the electrodes by a change in mutual capacitance between the electrodes, caused by the effect of the object on the electrical field between the electrodes. Typically, separate arrays of transmit and receive electrodes may be used to give a defined forward-facing detection zone. Because such systems are designed primarily to avoid collisions, they are not omni-directional, so that they may not detect side or rear collisions without the deployment of additional sensors. Vehicles may have systems to detect major collisions, such as systems to deploy airbags in a crash. However, existing systems for collision avoidance have limited capability for collision diagnosis, for example in detecting whether a collision, and for example a small scale impact, has actually occurred, and in particular existing systems lack omni-directional detection of a collision.

It is an object of the invention to address at least some of the limitations of the prior art systems.

SUMMARY

In accordance with a first aspect of the present invention, there is provided a method of generating a collision diagnosis for a traffic event involving a vehicle, the method comprising:
receiving an output from a self-capacitance sensor having a single electrode, the single electrode comprising at least part of the bodywork of the vehicle;
comparing the received output with at least one threshold to generate provisional collision detection data;
correlating the provisional collision detection data with further data relating to the traffic event to produce correlation data; and
generating the collision diagnosis on the basis of the correlation data.

An advantage of using a self-capacitance sensor having a single electrode, the single electrode comprising at least part of the bodywork of the vehicle, is that collisions may be detected at points all around the car body, so that detection is approximately omnidirectional, and that a simple and cheap arrangement is provided by avoiding the use of additional sensor electrodes or arrays.

An advantage of generating provisional collision detection data, correlating the provisional collision detection data with further data relating to the traffic event to produce correlation data, and generating the collision diagnosis on the basis of the correlation data, is that the false alarm rate of the collision diagnosis may be reduced compared to use on its own of the car bodywork as the single electrode of a self-capacitance sensor.

In an embodiment of the invention, the further data relating to the traffic event comprises data from at least one other sensor on the vehicle.

This allows more reliable collision diagnosis than would result from either the self-capacitance sensor or the other sensor or sensors alone.

The at least one other sensor may comprise a location sensor, an acceleration sensor, a rotation sensor, a vibration sensor, a microphone and/or a vehicle status sensor. These may provide convenient further indications of a collision.

In an embodiment of the invention, generating the collision diagnosis comprises generating an alert signal. This allows an indication of a collision diagnosis to be provided to an operator.

In an embodiment of the invention, the method comprises sending a message conveying the alert signal to a data network node external to the vehicle. This allows an operator in a location remote from the vehicle to be alerted of the collision diagnosis.

In an embodiment of the invention, the method comprises holding the provisional collision detection data in memory, the provisional collision detection data comprising a time of receipt of the output from the self-capacitance sensor. This allows non-real time processing of the provisional collision detector data.

In an embodiment of the invention, the further data relating to the traffic event comprises a time interval. This allows the collision diagnosis to comprise an indication of whether a collision took place within the time interval.

In an embodiment of the invention, the provisional collision detection data comprises location data, the further data relating to the traffic event comprises a specified location, and wherein the collision diagnosis comprises an indication of whether a collision took place at the specified location. This allows the collision diagnosis to comprise an indication of whether a collision took place at a specified location.

In accordance with a second aspect of the invention, there is provided apparatus for generating a collision diagnosis for a traffic event involving a vehicle, the apparatus comprising one or more processors and associated memory arranged to cause the apparatus to perform the claimed method.

In an embodiment of the invention, the apparatus comprises an oscillator having a terminal for connection to at least part of the bodywork of the vehicle, whereby to use the at least part of the bodywork of the vehicle as the single electrode of the self-capacitance sensor.

This has an advantage of providing an omni-directional sensor.

In accordance with a third aspect of the invention, there is provided a vehicle comprising the claimed apparatus.

Further features and advantages of the invention will be apparent from the following description of exemplary embodiments of the invention, which are given by way of example only.

DETAILED DESCRIPTION

By way of example, embodiments of the invention will now be described in the context of generating a collision diagnosis for a traffic event involving a vehicle, in which the vehicle is a private car, but it will be understood that embodiments of the invention may relate to other vehicles such as commercial vehicles, and that embodiments of the invention are not restricted to diagnosis of collisions with other vehicles but may relate to other traffic events such as collisions of the vehicle with roadside objects, for example street furniture, trees or buildings, and with people and/or animals.

Figure 1:
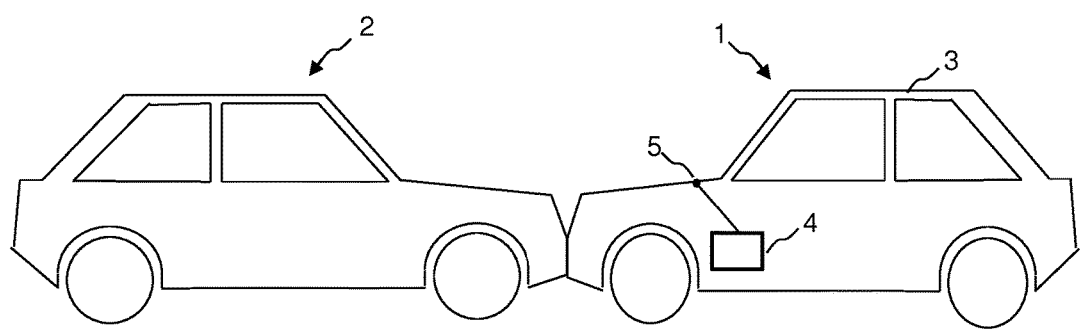
FIG. 1 is a schematic diagram illustrating a vehicle comprising apparatus according to an embodiment of the invention connected to the body work of the vehicle, the vehicle being in collision with another vehicle.

FIG. 1 shows a vehicle 1 comprising collision diagnosis apparatus 4 according to an embodiment of the invention connected to the body work 3 of the vehicle. The vehicle 1 is shown in collision with another vehicle 2. A collision diagnosis for a traffic event involving the vehicle may be an indication, in real or near-real time, that a collision has taken place, or may be an indication, on the basis of stored data, that a suspected collision within a specified time interval did in fact take place. The apparatus 4 comprises a single electrode self-capacitance sensor which is arranged to use the bodywork 3 of the vehicle, or at least part of the bodywork of the vehicle, as the single electrode of the sensor. In this way, the sensor detects the self-capacitance of the bodywork of the vehicle. This provides a sensor with an approximately omnidirectional response, so that collisions may be detected at points on each side of the vehicle, using a simple and cheap arrangement, avoiding the use of additional sensor electrodes or arrays. The bodywork may be connected to an oscillator in the apparatus, so that variations in the self-capacitance of the body change the operating frequency and/or amplitude of the oscillator. The ground of the oscillator is typically isolated from the car bodywork to prevent short circuiting of the oscillating signal. If the vehicle is in close proximity or touching another object, such as another vehicle or a roadside object, the self-capacitance of the bodywork changes and affects the amplitude and/or frequency of the oscillator. The other object need not be metallic or electrically conductive; even if the other object is non-conductive, the dielectric effect of the object will affect the apparent self-capacitance of the vehicle bodywork. Detection of a change in the frequency and/or the amplitude of the oscillator, or comparison of a factor related to the frequency and/or amplitude to one or more thresholds, may indicate that another object is touching or in close proximity to the vehicle bodywork. The apparatus is connected to the bodywork at a convenient connection point, for example connection point 5. By contrast, known capacitive detector systems for collision avoidance use two or more electrodes mounted on the vehicle, separate from the car bodywork, to provide reliable detection of the proximity of objects in front of the electrodes by a change in mutual capacitance between the electrodes, caused by the effect of the object on the electrical field between the electrodes.

Figure 2:
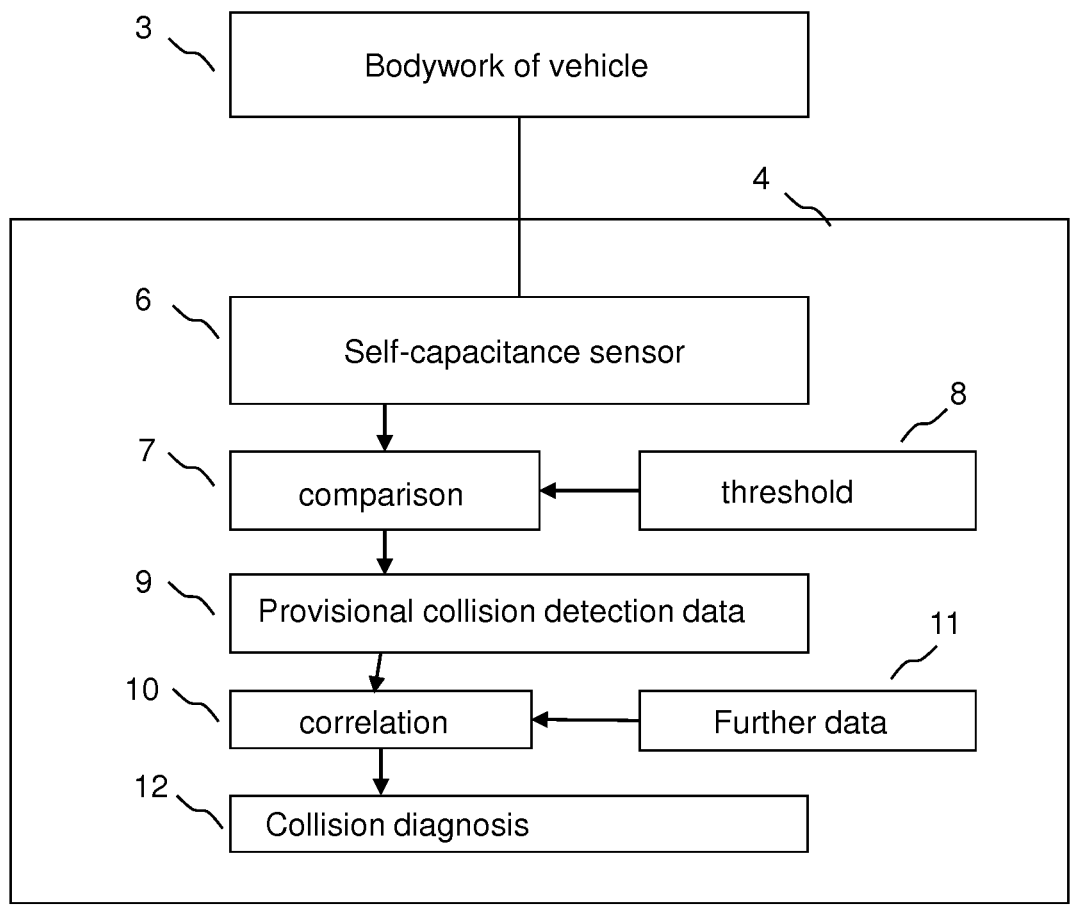
FIG. 2 is a schematic diagram illustrating operation of apparatus for collision diagnosis in an embodiment of the invention.

FIG. 2 is a functional block diagram that illustrates schematically the operation of apparatus according to an embodiment of the invention, in which a high false alarm rate, which might otherwise result from the use of the car bodywork as the single electrode of a self-capacitance sensor, is reduced by correlating with further data. An output is received, at a comparison functional block 7, from a self-capacitance sensor 6 having a single electrode comprising at least part of the bodywork of the vehicle 3. The received output is compared with a threshold 8, or more than one threshold, to generate provisional collision detection data 9. The provisional collision detection data 9 is correlated, in a correlation functional block 10, with further data 11 relating to the traffic event to produce correlation data, and a collision diagnosis 12 is generated on the basis of the correlation data. Generating provisional collision detection data, correlating the provisional collision detection data with further data relating to the traffic event to produce correlation data, and generating the collision diagnosis on the basis of the correlation data, allows the false alarm rate of the collision diagnosis to be reduced, or may mitigate the effects of a high false alarm rate, depending on the nature of the collision diagnosis.

Figure 3:
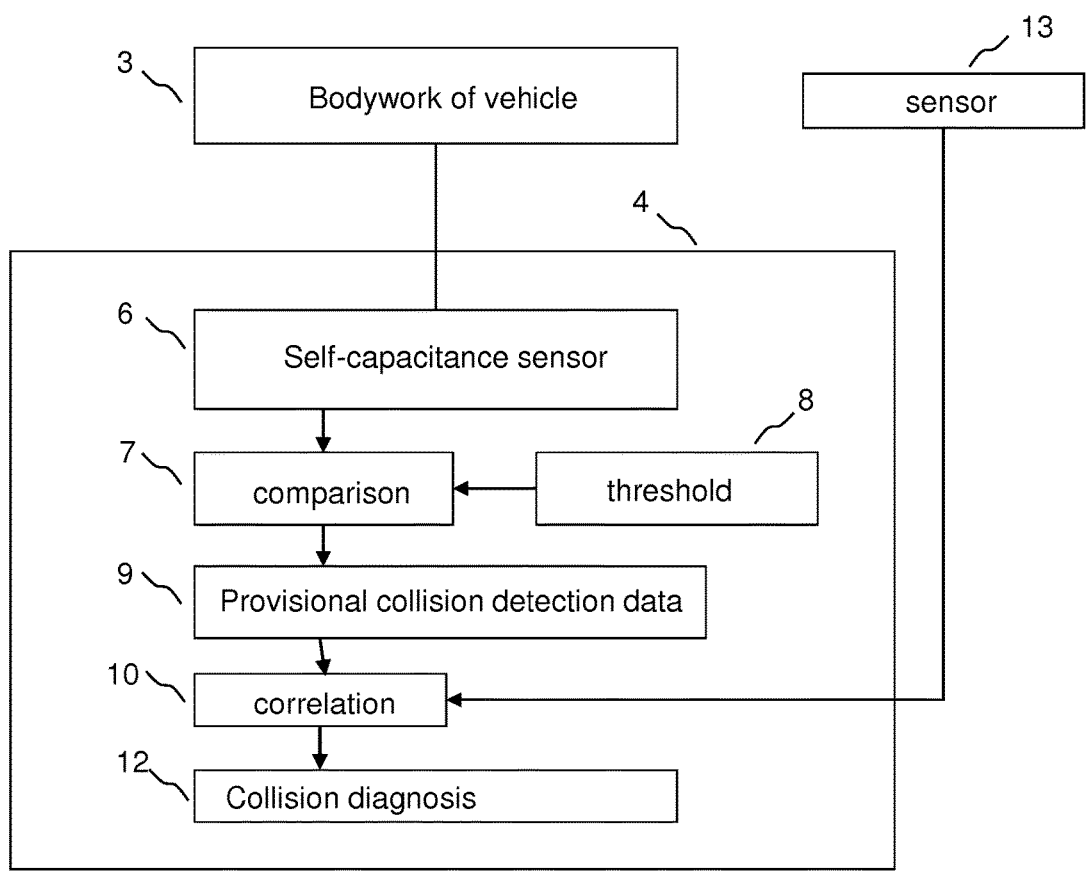
FIG. 3 is a schematic diagram illustrating operation of apparatus for collision diagnosis in an embodiment of the invention, in which further data is provided by a sensor.

As shown in the functional block diagram in FIG. 3, the further data relating to the traffic event may comprise data from at least one other sensor 13 on the vehicle, which may provide more reliable collision diagnosis than would result from use of either the self-capacitance sensor or the other sensor or sensors alone. The other sensor or sensors may comprise, for example, a satellite navigation receiver, an acceleration sensor, a rotation sensor, a vibration sensor and/or a vehicle status sensor, which may provide convenient further indications of a collision.

Figure 4:
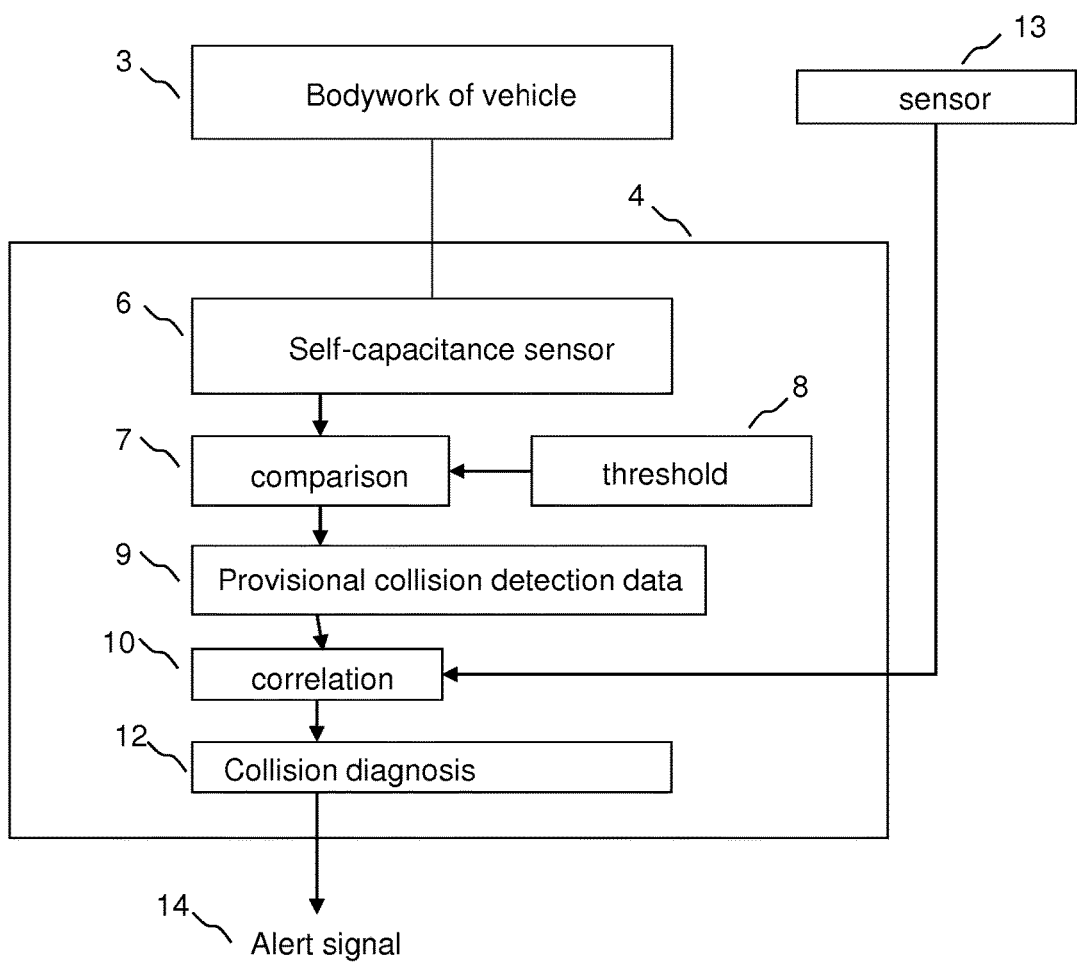
FIG. 4 is a schematic diagram illustrating operation of apparatus for collision diagnosis in an embodiment of the invention, in which an alert signal is provided on the basis of the collision diagnosis.

As shown in the functional block diagram in FIG. 4, generating the collision diagnosis comprises generating an alert signal 14, which allows an indication of a collision diagnosis to be provided to, for example, an operator, or to other electronic equipment. A message conveying the alert signal may be sent to a data network node external to the vehicle, so that, for example, an operator in a location remote from the vehicle may be alerted of the collision diagnosis. This may be referred to a direct detection, as the collision diagnosis may be generated in near real time and may be triggered by an output of one or more sensors.

Figure 5:
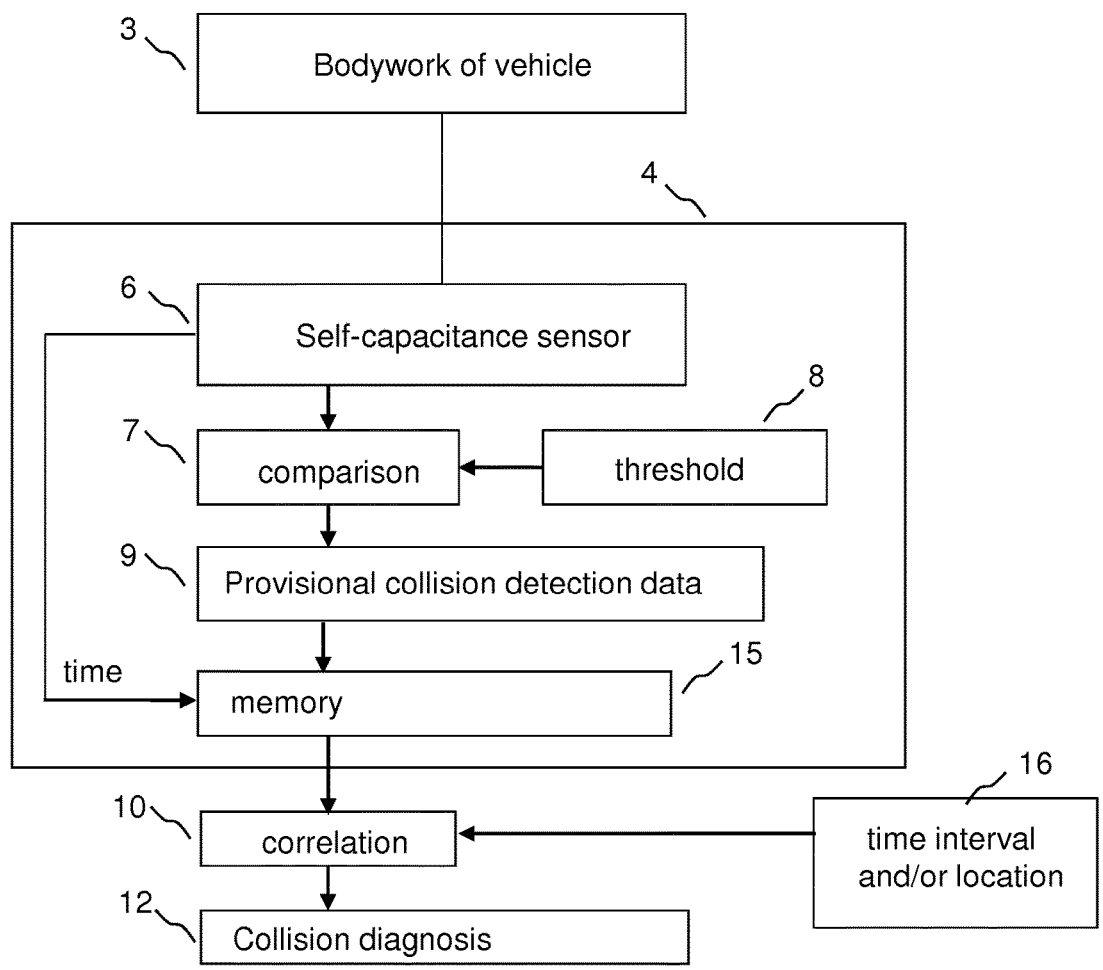
FIG. 5 is a schematic diagram illustrating operation of apparatus for collision diagnosis in an embodiment of the invention, in which data representing a time interval and/or a location is correlated with provisional collision detection data held in memory.

As shown in the functional block diagram in FIG. 5, the provisional collision detection data may be held in memory 15, the provisional collision detection data comprising the result of a comparison of the output of the self-capacitance sensor with one or more thresholds together with a time of receipt of the output from the self-capacitance sensor, allowing non-real time processing of the provisional collision detector data. Alternatively or in addition, the data representing the output of the self-capacitance sensor, rather than the provisional collision detection data, may be held in memory 15, together with a time of receipt and/or location data, allowing non-real time processing of the data representing the output of the self-capacitance sensor. The further data relating to the traffic event may comprise a time interval 16, so that the collision diagnosis may comprise an indication of whether or not a collision took place within the time interval. Alternatively or in addition, the provisional collision detection data comprises location data, the further data relating to the traffic event comprises a specified location, and the collision diagnosis comprises an indication of whether a collision took place at the specified location. This may be referred to as reverse detection, as the collision diagnosis may be generated after a delay, which may be as long as days or weeks after the time interval, and may be triggered by an after the event investigation of a supposed collision. A relatively high false alarm rate from the single electrode self-capacitance sensor may be tolerable when used for this purpose.

The apparatus for generating the collision diagnosis may comprise one or more processors and associated memory arranged to generate the collision diagnosis. The apparatus 4 may be, for example, an electronic module mounted in a vehicle, as shown in FIG. 1. Alternatively, parts of the apparatus may be located remotely from the vehicle, for example in a remote data processing centre. A radio or other link, for example a cellular radio link, may convey, for example, the results of the correlation 10 to an external process where the collision diagnosis may be performed.

Figure 6:
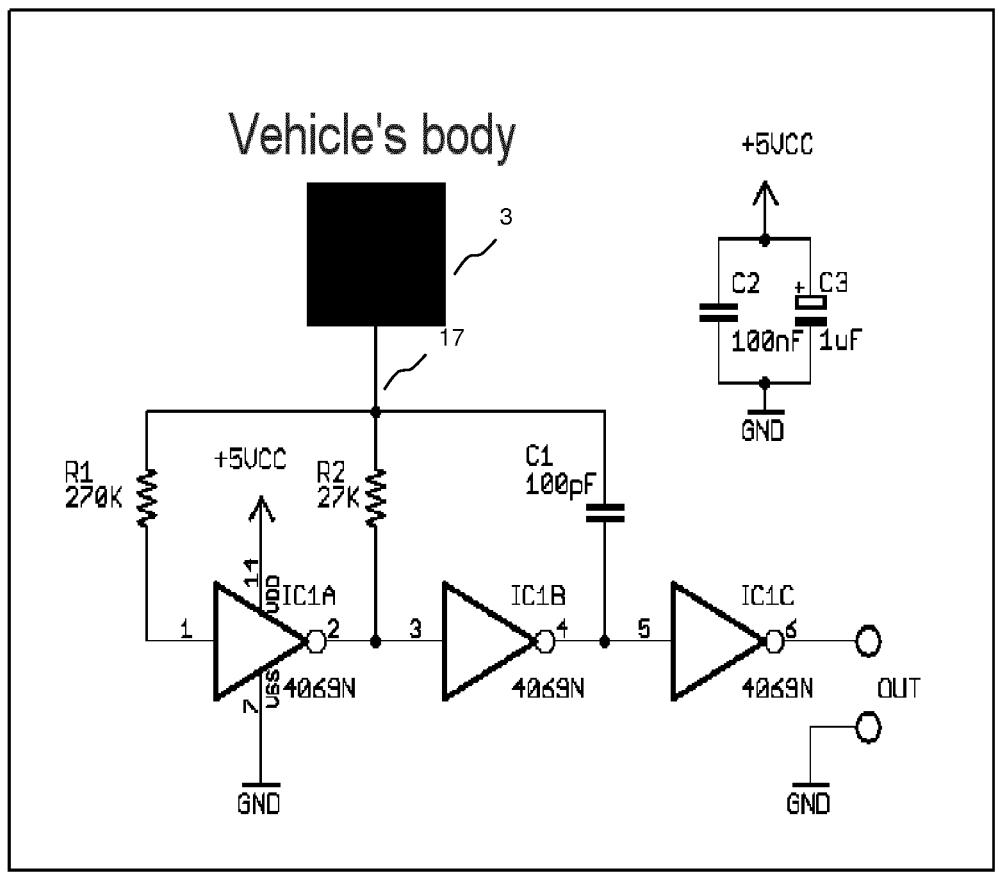
FIG. 6 is a schematic diagram showing a self-capacitance sensor in an embodiment of the invention.

FIG. 6 shows an example of the implementation of the single electrode self-capacitance sensor including an oscillator. As shown, the sensor comprises an RC oscillator, comprising inverting amplifiers IC1A and IC1B, resistors R1 and R2 and capacitor C1. The oscillator has a terminal 17 for connection to at least part of the bodywork of the vehicle 3, so that the bodywork of the vehicle is used as the electrode of the self-capacitance sensor. The self-capacitance of the bodywork of the vehicle 3, in conjunction with the capacitance of C1, determines the oscillating frequency of the oscillations of the oscillator. C1 is the discrete component capacitor used to set the basic oscillation frequency, and the bodywork of the vehicle 3, typically at a point on the metallic structure of the vehicle, is connected to the common point between C1 and R1/R2. Alternatively, the bodywork of the vehicle may be connected to the other side of C1, at point 5 in FIG. 6. The variation of frequency at the output of IC1C may be used to determine whether an object is touching or in close proximity with the vehicle. In the example of the circuit of FIG. 6, the oscillator is based on logic gates and therefore the amplitude of the output signal corresponds to the output voltage swing of the logic gates used, and, in this example, the amplitude may not be affected by the capacitance of the electrode.

The ground of the oscillator is isolated with respect to the vehicle's ground, which is typically provided by the vehicle's bodywork, to prevent the common point between C1 and R1/R2 from being be short-circuited to the ground of the tuned circuit through the vehicle's body, as this would stop the oscillations. The power supply of the self-capacitance sensor may be arranged to provide the electrical isolation between the sensor's circuit ground and the vehicle's ground through the use of a floating power supply, which is not directly connected to the vehicle ground, such as a Switched Mode Power Supply (SMPS) or other similar techniques. Alternatively, or in addition, a floating power supply for the self-capacitance sensor may be provided by a battery, which may be non-rechargeable or rechargeable. A solar panel may be used to recharge a rechargeable battery.

The circuit of FIG. 6 is one example of an oscillator that could be used in the self-capacitance sensor, but a variety of different oscillator types could be used. The principle underlying the self-capacitance sensor is that every object has a certain electrical self-capacitance. Whenever an object touches or is in close proximity with another object, the self-capacitance of the first object is influenced by the self-capacitance of the second object. Therefore, the variation of the electrical self-capacitance of an object may be used as a means to detect that another object was in contact or in close proximity with it. The variation of self-capacitance can be detected using an electrical oscillator where the frequency and/or the amplitude of the oscillation depends on the electrical self-capacitance of the object. Whenever a variation of the frequency and/or of the amplitude is observed, this is likely to be caused by a variation of the self-capacitance and hence the presence of another object in contact or in close proximity with the object considered. Large variations of self-capacitance may even cause the Barkhausen stability criterion not to be fulfilled, and therefore the electrical oscillation may completely stop until the objects are sufficiently separated again. A self-capacitance sensor may be referred to as a single electrode capacitive sensor.

The self-capacitance of an object depends on its size and shape, but is not strongly affected by the material of the object. An object made with conductive material will have a self-capacitance that is only slightly greater that of a similar object made from insulating materials. So, for example, an ideal conductive sphere will have a self-capacitance, C given by: $C=4\pi\varepsilon_0 R$. If R=1.5 m, C=167 pF. For comparison, an ideal non-conductive sphere of the same size will have a self-capacitance, C, given by: $C=(10\pi\varepsilon_0 R)/3$. For R=1.5 m, C=139 pF.

When two objects are in contact (not necessarily in electrical contact between electrically conductive parts) their self-capacity roughly adds up, and this condition can be detected through suitable electronic circuitry. However, significant capacitance variations of an object may also occur in the case of close proximity but without an actual contact, especially when the other object is much larger (e.g., a truck in close proximity of a car). This may trigger false detections. Various types of electrical disturbances may also trigger false detections.

The variation of self-capacitance may be detected by amplitude or frequency detection of the oscillations of an oscillator, which may include a tuned circuit, or by a combination of amplitude and frequency detection. Amplitude detection may, for example, be implemented through rectification of the wave produced by the oscillator, and the rectified signal may be compared with one or more amplitude thresholds. Alternatively, the oscillator signal may be converted from the analogue to a digital domain and then one or more thresholds may be applied to the numerical results after the A/D conversion. Multiple thresholds may be used to produce detection at multiple confidence levels. Detection may also occur by considering the time derivative of the amplitude rather than the amplitude, so that variations are emphasised.

Frequency detection may be implemented, for example, by a conventional frequency-to-voltage conversion circuit, and detection may be performed through appropriate voltage thresholds to provide detection at multiple confidence levels. Frequency may, for example, be measured by a conventional frequency measurement circuitry that counts the number of cycles produced by the oscillator in a given period of time, typically less than a second, and advantageously less than 100 ms, and may be less than 50 ms, as collisions between vehicles typically last around 50 to 100 ms. The detection may occur when the frequency variation exceeds one or more predefined frequency variation thresholds. Alternatively, a frequency measurement may be performed indirectly by measurement of a period, being the duration of cycles produced by the oscillator. The period may be determined by averaging the duration of multiple cycles, however the number of cycles considered for the average must not be too large in order to provide significant results for events of short duration. For example the average may be determined for less than 100 ms, or for less than 50 ms. The detection may occur when the variation of period exceeds one or multiple predefined period variation thresholds.

The operation of a self-capacitance sensor has been described above in terms of variation of the self-capacitance of the vehicle body acting as a single electrode connected to an oscillator. However, the operation of the same circuit can be described in terms of the car body being an antenna connected to the oscillator. In this case, the frequency and/or amplitude of the oscillation depends on the characteristics of the antenna, and in particular the impedance match of the antenna. Whenever another object touches or is in close proximity with the antenna, the second object gets electromagnetically coupled with the first object and becomes in effect part of the antenna itself, thus changing its electrical characteristics and therefore causing a variation in frequency and/or amplitude of the oscillation.

So, to detect the collision of a vehicle with other vehicles and, in general, with other objects, the self-capacitance of the body of the vehicle is used as an element of an electrical oscillator. Both conductive and non-conductive parts of the bodywork contribute to the self-capacitance of the body of the vehicle. However, proximity with other vehicles as well as electrical disturbances may cause false positives, that is to say the detection of collisions that did not actually occur. Therefore, in embodiments of the invention, the self-capacitive sensor, may be combined with various auxiliary systems and features, such as additional sensors.

The results of the detection process may be logged for being evaluated at a later time, possibly in conjunction with the data originated by other sensors. The results of the detection process may be stored in a memory that is co-located with the detector circuitry. Data can be retrieved at a later time using a data communication function. Alternatively or in combination, the results of the detection process may be transmitted in near real time to external systems that store the data autonomously with respect to the sensor and to the detector. The results of the detection process may be made available to the external world, either in real time or retrieved from the local memory at a later time, through wired and/or wireless connections. For example, a wired connection within the vehicle may comprise a RS-232, USB, or I2C connection. A wireless connection may comprise a short range wireless connection, for example Bluetooth or WiFi, and/or a mobile network connection such as GSM, GPRS, UMTS and/or LTE. For example, Bluetooth may be used to transfer the detected data to the smartphone of the vehicle's owner/driver, and then the smartphone's GSM, GPRS, UMTS and/or LTE network connection can be used to make the data available outside the vehicle. A similar result may be achieved using an electronic unit installed in the vehicle and that incorporates both Bluetooth and GSM, GPRS, UMTS and/or LTE communication features.

Figure 7:
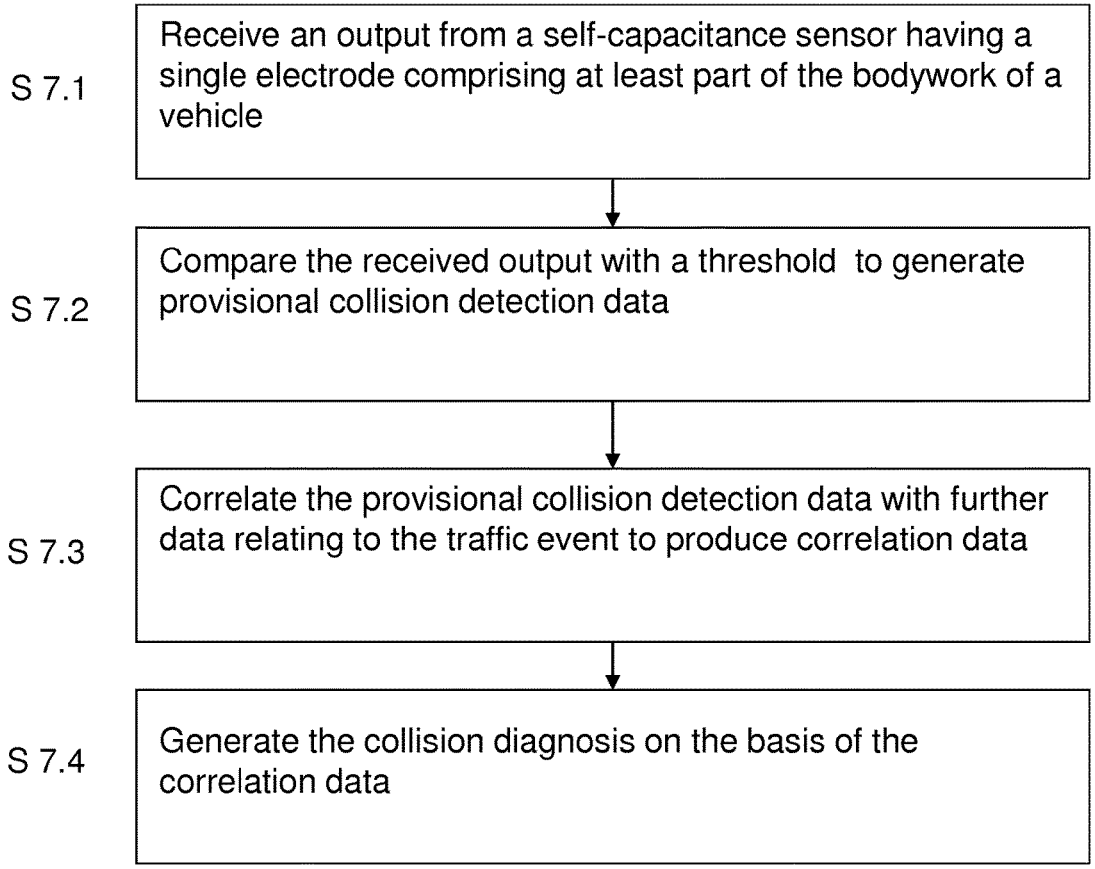
FIG. 7 is a flow diagram of a method of generating a collision diagnosis for a traffic event involving a vehicle in an embodiment of the invention.

FIG. 7 shows a flow diagram summarising the steps of an exemplary method of generating a collision diagnosis for a traffic event involving a vehicle in an embodiment of the invention. At step S7.1, an output is received from a self-capacitance sensor having a single electrode comprising at least part of the bodywork of the vehicle. At step S7.2, the received output is compared with a threshold to generate provisional collision detection data. At step S7.3, the provisional collision detection data is correlated with further data relating to the traffic event to produce correlation data, and at step S7.4, the collision diagnosis is generated on the basis of the correlation data.

A single electrode self-capacitance sensor may be used, typically in conjunction with other sensors and systems, to detect the collision of a vehicle with other vehicles or, in general, with other objects. Data derived from a collision diagnosis may be used to support the management of a possible insurance claim that may be associated to the collision.

In a process of direct detection, for example as illustrated by FIGS. 3 and 4, the detection of a variation of self-capacitance may proactively trigger an alert signal that is ultimately dispatched to human operators, in real time or almost in real time. Due the probability of false positive detections related to proximity of large vehicles and/or due to electrical disturbances, direct detection is preferably obtained through the combination of the output of the self-capacitance sensor with the output of other sensors so as to confirm that an actual collision occurred.

In a process of reverse detection, for example as illustrated by FIG. 5, the detection of a variation of self-capacitance may simply trigger the logging of an event in the local memory of the self-capacitance sensor and/or in the memory of external devices and systems connected to the self-capacitance sensor itself. There may be no alert signal dispatched to operators in real time.

As a potential use of this system, the log may be searched to determine whether a variation of self-capacitance was detected at the date and time, or within a time interval, when an accident occurred according to a respective claim report, for example an insurance claim report. The information may be used to check the accuracy of the claim report. As the log may be searched within a limited time frame around the supposed time of the collision or accident, the presence of false positives may be tolerated, and therefore the reverse detection process may be effectively supported by the self-capacitance sensor even without any combination with other sensors.

As described herein, combining information from a single electrode self-capacitance sensor with information from other sensors may increase the level of confidence that a collision actually occurred. This is especially convenient to support the direct detection process. The following sensors, in any combination, as well as other sensor types, can be used to this purpose: time, location, and speed sensors such as GPS and/or GNSS, and/or network synchronisation and geo-location based on GSM/GPRS/UMTS and/or LTE; acceleration sensors; rotation sensors, for example gyroscope based sensors; vibration sensors, such as a microphone; and vehicle status sensors, such as sensors for braking force, throttle position, and steering angle. The sensors may either installed on the vehicle for the specific purpose of supporting the collision diagnosis together with the self-capacitance sensor, or may be sensors originally installed on the vehicle, which may provide the relevant data through the vehicle's Control Area Network (CAN) bus and/or OBD port.

The above embodiments are to be understood as illustrative examples of the invention. It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

What is claimed is:

1. A method of generating a collision diagnosis for a traffic event involving a vehicle, the method comprising:
    receiving an output from a single electrode self-capacitance sensor which is arranged to use the vehicle's bodywork as the single electrode of the self-capacitance sensor, wherein the single electrode self-capacitance sensor detects a self-capacitance of the vehicle's bodywork;
    comparing the received output with at least one threshold to generate provisional collision detection data;
    correlating the provisional collision detection data with further data relating to the traffic event to produce correlation data; and
    generating the collision diagnosis on the basis of the correlation data.

2. A method according to claim 1, wherein the further data relating to the traffic event comprises data from at least one other sensor on the vehicle.

3. A method according to claim 2, wherein the at least one other sensor comprises a location sensor.

4. A method according to claim 2, wherein the at least one other sensor comprises an acceleration sensor.

5. A method according to claim 2, wherein the at least one other sensor comprises a rotation sensor.

6. A method according to claim 2, wherein the at least one other sensor comprises a vibration sensor.

7. A method according to claim 2, wherein the at least one sensor comprises a microphone.

8. A method according to claim 2, wherein the at least one other sensor comprises a vehicle status sensor.

9. A method according to claim 2, wherein generating the collision diagnosis comprises generating an alert signal.

10. A method according to claim 9, comprising sending a message conveying the alert signal to a data network node external to the vehicle.

11. A method according to claim 1, comprising holding the provisional collision detection data in memory, the provisional collision detection data comprising a time of receipt of the output from the self-capacitance sensor.

12. A method according to claim 11, wherein the further data relating to the traffic event comprises a time interval.

13. A method according to claim 12, wherein the collision diagnosis comprises an indication of whether a collision took place within the time interval.

14. A method according to claim 12, wherein the provisional collision detection data comprises location data, the further data relating to the traffic event comprises a specified location, and wherein the collision diagnosis comprises an indication of whether a collision took place at the specified location.

15. Apparatus for generating a collision diagnosis for a traffic event involving a vehicle, the apparatus comprising:
    a single electrode self-capacitance sensor which is configured to use the vehicle's bodywork as the single electrode of the self-capacitance sensor, wherein the single electrode self-capacitance sensor is configured to detect a self-capacitance of the vehicle's bodywork; and
    one or more processors and associated memory configured to:
        receive an output from the single electrode self-capacitance sensor;
        compare the received output with at least one threshold to generate provisional collision detection data;
        correlate the provisional collision detection data with further data relating to the traffic event to produce correlation data; and
        generate the collision diagnosis on the basis of the correlation data.

16. Apparatus according to claim 15, the single electrode self-capacitance sensor comprising an oscillator having a terminal for connection to the vehicle's bodywork at a point on the vehicle's metallic structure, whereby to use the vehicle's bodywork as the single electrode of the self-capacitance sensor.

17. A vehicle comprising apparatus according to claim 15.

* * * * *